United States Patent
Wakeford et al.

(10) Patent No.: US 11,086,477 B2
(45) Date of Patent: *Aug. 10, 2021

(54) FACILITATING AUTOMATIC EXECUTION OF USER INTERACTIONS IN A VIRTUAL SPACE

(71) Applicant: Kabam, Inc., San Francisco, CA (US)

(72) Inventors: Kent Wakeford, Hillsborough, CA (US); Clifford J. Harrington, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/018,513

(22) Filed: Sep. 11, 2020

(65) Prior Publication Data

US 2020/0409530 A1 Dec. 31, 2020

Related U.S. Application Data

(63) Continuation of application No. 16/510,251, filed on Jul. 12, 2019, now Pat. No. 10,788,949, which is a continuation of application No. 13/946,842, filed on Jul. 19, 2013, now Pat. No. 10,394,414.

(51) Int. Cl.
*G06F 3/0481* (2013.01)
*A63F 13/00* (2014.01)

(52) U.S. Cl.
CPC .......... *G06F 3/04815* (2013.01); *A63F 13/00* (2013.01)

(58) Field of Classification Search
CPC .... G06F 3/04815; G06F 3/0481; G06F 3/048; A63F 13/00
See application file for complete search history.

(56) References Cited

U.S. PATENT DOCUMENTS

| | | | |
|---|---|---|---|
| 6,400,940 B1 * | 6/2002 | Sennett | H04M 3/42153 455/412.1 |
| 6,763,384 B1 | 7/2004 | Gupta | |
| 7,124,175 B1 | 10/2006 | Wolfe | |
| 7,713,116 B2 | 5/2010 | Keam | |
| 7,788,176 B2 | 8/2010 | Gupta | |

(Continued)

FOREIGN PATENT DOCUMENTS

WO 2001035600 5/2001

OTHER PUBLICATIONS gw.igg.com, Godswar, Aug. 14, 2009, www.archive.org, 9 pages.

(Continued)

*Primary Examiner* — Jung-Mu T Chuang
(74) *Attorney, Agent, or Firm* — Esplin & Associates, PC

(57) ABSTRACT

A system and method for facilitating automatic execution of user interaction in a virtual space are disclosed. For such facilitations, interactions initiated by users may be monitored and examined. The examination of the user interactions may be made based on various parameters that depend on user interaction levels in the virtual space. Based on results of such examinations, user interactions to be automatically executed in the virtual space while the users are not participating in the virtual space may be determined. In some examples, such determinations may be based on the user interaction levels in the virtual space and/or one or more virtual items and/or real-world currencies spent by the users for the automatic execution of the user interactions.

20 Claims, 5 Drawing Sheets

(56) References Cited

U.S. PATENT DOCUMENTS

| | | | |
|---|---|---|---|
| 8,038,535 B2 | 10/2011 | Jensen | |
| 8,313,370 B2 * | 11/2012 | Rogers | A63F 13/10 463/23 |
| 8,360,873 B1 * | 1/2013 | Wickett | A63F 13/79 463/29 |
| 8,393,967 B2 | 3/2013 | Farrier | |
| 8,430,755 B2 * | 4/2013 | Youm | A63F 13/49 463/42 |
| 8,535,163 B2 | 9/2013 | Ayyar | |
| 8,719,730 B2 | 5/2014 | Ganetakos | |
| 8,734,254 B2 * | 5/2014 | Aguilar, Jr. | G07F 17/32 463/42 |
| 8,764,568 B2 | 7/2014 | Holme | |
| 8,771,081 B2 | 7/2014 | Walker | |
| 8,790,183 B2 | 7/2014 | Ganz | |
| 8,805,939 B2 | 8/2014 | Ye | |
| 8,840,465 B2 | 9/2014 | Mello | |
| 8,961,301 B2 | 2/2015 | Fine | |
| 8,990,688 B2 | 3/2015 | Lee | |
| 9,069,381 B2 | 6/2015 | Geisner | |
| 9,213,982 B2 * | 12/2015 | Allen | G06T 19/003 |
| 9,289,686 B2 | 3/2016 | Hall | |
| 9,320,971 B2 | 4/2016 | De Jesus | |
| 9,616,345 B2 | 4/2017 | Harvey | |
| 9,804,730 B2 | 10/2017 | Lefor | |
| 2002/0193162 A1 | 12/2002 | Walker | |
| 2003/0009379 A1 | 1/2003 | Narasimhan | |
| 2004/0230661 A1 | 11/2004 | Rashid | |
| 2006/0287047 A1 | 12/2006 | Walker | |
| 2007/0077993 A1 | 4/2007 | Midgley | |
| 2007/0092859 A1 * | 4/2007 | Watts | G09B 5/00 434/322 |
| 2007/0097832 A1 | 5/2007 | Koivisto | |
| 2007/0155494 A1 * | 7/2007 | Wells | A63F 13/58 463/35 |
| 2007/0260567 A1 | 11/2007 | Funge | |
| 2007/0265091 A1 | 11/2007 | Aguilar | |
| 2008/0090659 A1 | 4/2008 | Aguilar | |
| 2008/0119281 A1 | 5/2008 | Hirose | |
| 2008/0261680 A1 * | 10/2008 | Buecheler | G07F 17/3239 463/23 |
| 2009/0264190 A1 | 10/2009 | Davis | |
| 2010/0029386 A1 | 2/2010 | Pitsch | |
| 2010/0056280 A1 | 3/2010 | Langan | |
| 2010/0312724 A1 | 12/2010 | Pinckney | |
| 2011/0016182 A1 | 1/2011 | Harris | |
| 2011/0265041 A1 | 10/2011 | Ganetakos | |
| 2011/0287823 A1 | 11/2011 | Guinn | |
| 2012/0142429 A1 | 6/2012 | Muller | |
| 2012/0159352 A1 | 6/2012 | Everett | |
| 2012/0179750 A1 | 7/2012 | Gollapalli | |
| 2012/0238365 A1 | 9/2012 | Gaiba | |
| 2012/0283014 A1 * | 11/2012 | Van Luchene | A63F 13/847 463/31 |
| 2013/0035164 A1 | 2/2013 | Osvald | |
| 2013/0053989 A1 | 2/2013 | Miller | |
| 2013/0054689 A1 | 2/2013 | Woldman | |
| 2013/0090170 A1 | 4/2013 | Reed | |
| 2013/0165234 A1 | 6/2013 | Hall | |
| 2013/0172068 A1 | 7/2013 | Zhou | |
| 2013/0178281 A1 * | 7/2013 | Ayyar | A63F 13/35 463/30 |
| 2013/0288757 A1 | 10/2013 | Guthridge | |
| 2013/0311924 A1 | 11/2013 | Denker | |
| 2014/0121007 A1 * | 5/2014 | Santini | A63F 13/49 463/29 |
| 2014/0232534 A1 | 8/2014 | Birnbaum | |
| 2014/0274413 A1 * | 9/2014 | Chelst | A63F 13/847 463/42 |
| 2014/0343700 A1 * | 11/2014 | Soohoo | G07F 17/3255 700/91 |
| 2014/0357350 A1 | 12/2014 | Weingardt | |
| 2015/0065095 A1 | 3/2015 | Seo | |
| 2015/0172441 A1 | 6/2015 | Samhat | |
| 2015/0339039 A1 * | 11/2015 | Arnone | G07F 17/3244 463/25 |
| 2015/0341901 A1 | 11/2015 | Ryu | |
| 2016/0073237 A1 * | 3/2016 | Kaido | H04W 4/02 455/457 |
| 2016/0342317 A1 | 11/2016 | Lim | |
| 2018/0043256 A1 | 2/2018 | Colenbrander | |
| 2019/0332245 A1 | 10/2019 | Wakeford | |

OTHER PUBLICATIONS www.thebuddyforum.com, Honorbuddy1 , Apr. 14, 2011, 6 pages.
www.thebuddyforum.com, Honorbuddy2, Mar. 11, 2011, 5 pages.
Godswar Online Game (newly retrieved from https://web.archive.org/web/20090814064142/http:l/gw.igg.com:80/guide/guide.php?acid=75; pub date: Aug. 2009; last accessed Jul. 3, 2018) 60 pages.

* cited by examiner

FACILITATING AUTOMATIC EXECUTION OF USER INTERACTIONS IN A VIRTUAL SPACE

FIELD OF THE DISCLOSURE

This disclosure relates to facilitating automatic execution of user interactions on behalf a user in a virtual space while the user is not participating in the virtual space, the automatic execution of the user interactions being facilitated based on information regarding user interactions with the virtual space while the users participating in the virtual space, a level of the user in the virtual space, and/or other basis.

BACKGROUND

Systems that facilitate automatic execution of system commands are known. Those systems typically enable administrators of the systems to schedule automatic execution of the system commands via scripts. For example, "crontab" is a well-known utility provided by Unix systems to facilitate automatic execution of system commands contained in scripts. Virtual space systems that facilitate user advancements through leveling are known. In those virtual space systems, users of the virtual space are typically enabled to advance to the next level upon completion of one or more goals. objectives, missions, and/or a number of points required by the previous level in the virtual space.

SUMMARY

One aspect of the disclosure relates to facilitating automatic execution of user interactions on behalf of users of a virtual space while the users are not participating in the virtual space. For determining which user interactions should be automatically executed, interactions with the virtual space by the users while participating in the virtual space may be monitored. In some examples, the determination of user interactions to be automatically executed on behalf of a given user may be based on an interaction level of the given user such that the automatic execution of the user interactions for the given user may be enhanced as the given user's interaction level advances in the virtual space. This may make the user interactions executed automatically while the user is not participating in the game more valuable or useful to the user, as the interaction level of the user increases.

A system configured to facilitate automatic user interactions in a virtual space may include a server. The server may operate in a client/server architecture with one or more client computing platforms. The client computing platforms may be associated with the users of the virtual space. The server may be configured to execute one or more of a space module, user module, user interaction module, automatic action determination module, automatic action execution module, and/or other modules.

The space module may be configured to implement the instance of the virtual space executed by the computer modules to determine state of the virtual space for further processing and/or presentation on a client computer platform associated with the given user. Participation in the instance of the virtual space may be initiated by virtual space commands input by users through client computing platforms. The virtual space commands may be executed in the virtual space such that user interactions with the virtual space may be effectuated. For example, a user may input commands to undertake specific deeds, actions, functions, sphere of actions, and/or any other user interactions with the virtual space. Within the instance of virtual space, levels may be established to facilitate and/or incentivize user advancements in the virtual space. A user may advance to a next virtual space level when a certain goal has been reached, an end condition has been fulfilled by the user in the virtual space, the user has acquired a number of virtual points and/or any other conditions for level advancement by the user are met. Advancements in user levels typically result in attribute boosts, skill boosts, resistance boosts, higher status, and/or any other user progressions in the virtual space.

The user module may be configured to manage user accounts associated with the individual users. The user accounts may include user parameters related to the users. The user accounts may include a first user account associated with the first user that includes a first set of user parameters related to the first user. The first user account may include user information indicating an interaction level of the first user, which may reflect an amount of interactions with the virtual space by the first user.

The user interaction module may be configured to monitor interactions of the users with the virtual space and/or with one another within the virtual space. This may include monitoring, for a given user, one or more of times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users.

The user interaction module may be configured to obtain user interaction information reflecting previous user interactions with the virtual space for a given user. The obtained user interaction information for the given user may indicate interactions by the given users during a past real-world time period or virtual space period. In some exemplary implementations, user interaction module may be configured to determine patterns of user interactions with the virtual space based on the obtained user interaction information. The patterns of user interactions determined by the user interaction module may reflect routines that appeared in the user interactions, playing styles by which the users interact with the virtual space, one or more user actions undertaken by users with certain frequencies, and/or any other patterns of the user interactions with the virtual space. In some examples, the determination of the patterns of user interactions by the user interaction module may be based on interaction levels of the users in the virtual space. For example, for a given user, parameters for examining the user interactions for determining patterns of the given user's interactions with the virtual space may be determined based on the interaction level of the given user.

The automatic action determination module may be configured to determine user interactions to be automatically executed in the virtual space on behalf of users while users are not participating in the virtual space. In some exemplary implementations, the determination of the automatic execution of the user interaction by the automatic action determination module may include a selection of one or more types of user interactions to be automatically executed, a determination of a quantity of the user interactions to be automatically executed, a determination of duration during which the determined user interactions are to be so automatically executed, a determination of frequencies at which the determined user interactions are to be automatically executed, and/or other determinations. In some examples, such determinations by the automatic action determination module may be made for the given user based on the interaction level of the given user in the virtual space. In some examples, such determinations by the automatic action determination module may be made based on quantities of virtual and/or real-world items spent by the users for automatically executing the determined user interactions.

In some exemplary implementations, the determinations of the user interactions to be automatically executed in the virtual space on behalf of the users may be made based on the user interaction patterns determined by the user interaction module. For example, the user interaction pattern determined by the user interaction module for a given user may indicate a routine undertaken by the given user. In that example, the determination of the automatic execution of the user interactions by the automatic action determination module may be based on such a routine. For instance, user interactions of certain interaction types in this routine, e.g., gathering and harvesting, may be determined by the automatic action determination module to be automatically executed in the virtual space while the given user not participating in the virtual space.

The automatic action execution module may be configured to automatically execute, in the virtual space, the user interactions determined by the automatic action determination module. In some exemplary implementations, such automatic executions of user interactions for a given user may be performed by the automatic action execution module during a period and/or at a frequency as determined by the automatic action determination module for the given user. In some exemplary implementations, the user interactions automatically executed by the automatic action execution module may be performed as though they were initiated by the users such that other users in the virtual space do not recognize the users are not participating in the virtual space. In some exemplary implementations, the automatic execution of the user interactions by the automatic action execution module may merely modify the virtual space state as results of the user interactions without really executing the user interactions.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
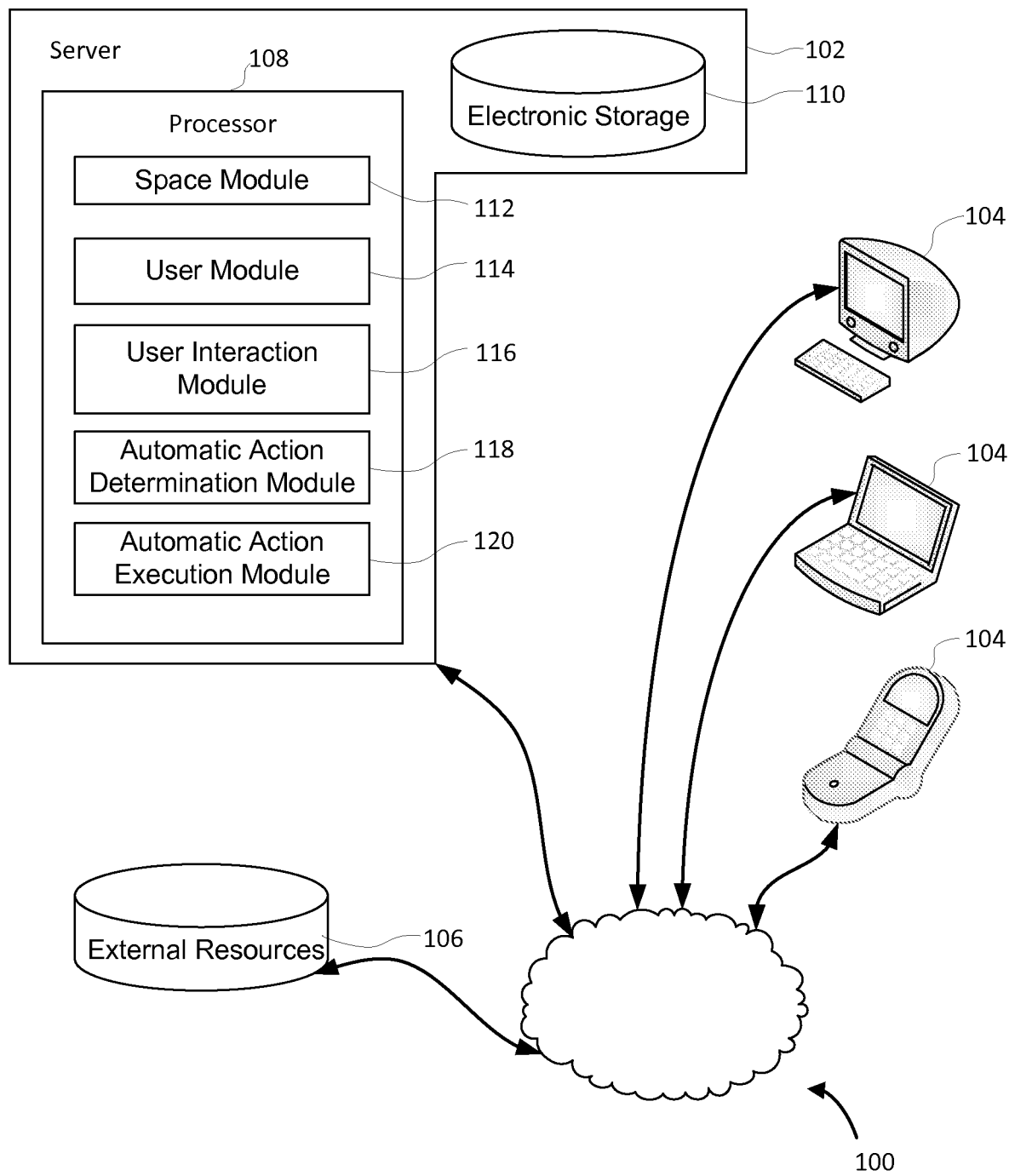
FIG. 1 illustrates a system configured to facilitate automatic user interaction execution in a virtual space.

FIG. 1 illustrates a system 100 configured to facilitate automatic user interaction execution in a virtual space. Providing the virtual space may include hosting the virtual space over a network. In some implementations, system 100 may include a server 102. The server 102 may be configured to communicate with one or more client computing platforms 104 according to a client/server architecture. The users may access system 100 and/or the virtual space via client computing platforms 104. The computer program modules may include one or more of a space module 112, user module 114, user interaction module 116, automatic action determination module 118, automatic action execution module 120, and/or other modules.

The space module 112 may be configured to implement the instance of the virtual space executed by the computer modules to determine state of the virtual space. The state may then be communicated (e.g., via streaming visual data, via object/position data, and/or other state information) from server 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by space module 112 is not intended to be limiting. The space module 112 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 112, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server 102 (e.g., through space module 112).

Participation in the instance of the virtual space may be initiated by users by inputting commands through client computing platforms 104 for requesting the user interactions. The commands may be executed in the virtual space such that the requested user interactions may be effectuated in the virtual space. For example, the user may input commands to undertake specific deeds, actions, functions, or sphere of actions within the virtual space. The commands may specify inputs related to virtual space activities provided by the virtual space. Examples of virtual space activities provided by the instance of virtual space may include constructing, upgrading, demolishing buildings, harvesting, gathering, healing, spell casting, training, marching, reinforcing, reassigning, recruiting, arranging formations, transporting troops, attacking, developing, creating, demolishing and/or defending cities, realms, kingdoms, and/or any other virtual space location entities, crafting or transporting virtual items, attacking, and/or interacting with non-player characters (NPCs herein-after) and/or other user characters, researching for skills levels, experiences, mining and/or prospecting for virtual resources, completing missions, quests, and/or campaigns, and/or any other activities provided by the virtual space. In some examples, the activities provided by the virtual space may facilitate the user to compete elements and/or objects in an environment within the virtual space—i.e., PvE activities. In some examples, the activities provided by the virtual space may facilitate the user to compete against one another within the virtual space—i.e., PvP activities.

Some virtual space activities may require consumption of virtual resources, such as but not limited to, stone, wood, gold, minerals (e.g., iron, ore, oil, crystal, coal, etc.), plants, food, currencies (virtual and/or real currencies), improvement resource (e.g., health provided by fountain of youth, wisdom provided by tree of wisdom, speed-up provided by hour-glass, etc.) and/or any other virtual resources appropriate for the virtual space activities. During the virtual space activities, an amount of the resources required by the virtual space activities may be increased or decreased in the user inventory to reflect a consumption (including exhaustion) or procurement of the resources in the virtual space by the user.

Some virtual space activities may require time durations for them to complete within the virtual space. Length of time durations required by different virtual space activities may vary based on various factors specific to the virtual space activities. For example, constructing a level 1 wall in the virtual space may require 30 minutes build time; constructing a level 2 wall may require 1 hour build time; constructing a level 3 wall may require 2 hour build time; constructing a level 4 wall may require 3 hour build time; and so on. Such required duration for an activity to complete within the virtual space may be shortened by user consumption of virtual items and/or resources. For example, hourglasses may be provided to users to shorten build time of a wall by various amount of time.

The virtual space activities may require user inputs from the users to facilitate participation of the activities by the users. As a virtual space activity progresses within the virtual space, one or more events within the virtual space may occur in relation to the virtual space activity. For example, during a troop marching activity engaged by a user, troops may be fatigued due to marching over unexpected treacherous terrains and therefore require morale boost to be provided by the user, e.g., by consuming virtual space resources. In another example, during a mining activity engaged by the user, NPC intruders (e.g., barbarians) may roam around the mines owned by the user and thus require the user to transport troops to defend the mines.

Within the instance of the virtual space, skills may be acquired by the users to undertake the virtual space activities. The skills acquired by the users may be tangibly represented as abilities learned by user characters associated with the users, e.g., attacking, defending, healing, spell casting, leadership, and/or any other skills. Provider, administrator, moderator, and/or any other entities related to the virtual space may organize virtual space skills into different types, e.g., gathering, harvesting, attacking, healing, defending, and so on. Within an individual type of skills, sub-types may be further classified, and within an individual sub-type, further sub-types may be classified, and so on. Within a type or sub-type of skills, skill levels may be established to classify adeptness of the type or the sub-type of the skills, likelihood of the user is to succeed with the type or sub-type of skills, possible consequences of the type or sub-type of skills, and/or any other aspects of the type or sub-type of skills.

The users may participate in the instance of the virtual space through virtual space sessions. A virtual space session includes complete activities and actions of a user within the virtual space, from the very first user action when the user joins the virtual space for the first time to the last user action before the user stops participating in the virtual space for good. Accordingly, a virtual space session typically finishes when a user decides to stop interacting with the virtual space for good or when provider, administrator, moderator, and/or any other entities related to the virtual space stop providing the virtual space to users for good. However, this is not necessary the only case, a virtual space session may finish, in some examples, when one or more events or virtual space conditions have occurred and/or when one or more objectives have been achieved or not achieved by the user as determined by the provider, administrator, moderator, and/or any other entities related to the virtual space. For example, a virtual space session may finish when the user has killed the last monster in the virtual space; has achieved an ultimate goal in the virtual space; fails to achieve certain score or experience level within predetermined time; the user character has been killed in the virtual space; and so on.

A virtual space session may include one or more play sessions during which a user participates in the virtual space. That is, the time for the user to complete a virtual space session may be divided into several different occasions— i.e., different play sessions. In some examples, a play session may start from when a user logs into and finish when the user logs off system 100 in one occurrence. However, this is not necessary the only case. A player session may be determined by provider, administrator, moderator, and/or any other entities related to the virtual space in however measurements as desired. For example, a play session may be measured by frequencies of user participation in activities within the virtual space such that a play session finishes when the user stops participating activities for a period of time over a predetermined threshold.

The user module 114 may be configured to access and/or manage one or more user profiles and/or user information associated with users of the system 100. The one or more user profiles and/or user information may include information stored by server 102, one or more of the client computing platforms 104, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users. The user information managed by the user module 114 may include information indicating levels of interaction with the virtual space by individual users. The interaction level of an individual user as indicated in such information may reflect an amount of interaction with the virtual space by the individual user.

The user interaction module 116 may be configured to monitor interactions of the users with the virtual space and/or with one another within the virtual space. This may include monitoring, for a given user, one or more of times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by user interaction module 116 in monitoring the interactions of the users may be stored to the user profiles managed by a user module 114.

At a given time, user interaction module 114 may determine a set of users that are currently engaged with the virtual space and/or a set of users that are currently not engaged with the virtual space. Being engaged with the virtual space may refer to being logged in to the virtual space, performing some action or interaction within the virtual space within some period of time (e.g., the last 2 minutes of the current play session), and/or other taking some other action indicating ongoing and contemporaneous engagement with the virtual space.

In some exemplary implementations, the user interaction module 116 may be configured to determine, for individual users, an activity metric that indicates an activity level within the virtual space. The activity metric may be determined based on one or more of log in frequency, amount of time logged in to the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, amount of real world money spent in the virtual space, and/or other activity parameters.

The user interaction module 116 may be configured to obtain user interaction information reflecting previous user interactions with the virtual space for a given user. The obtained user interaction information for the given user may indicate interactions by the given users as monitored and recorded by the user interaction module 116 previously, e.g., during a past real-world time period or virtual space period. For example, the user interaction information obtained for the given user may indicate user interactions by the given user in the last 5 days, last month, last 3 months, last 5 play sessions, last 50 play sessions, and so on. In some exemplary implementations, the quantity of user interactions to be obtained in the user interaction information for the given user by the user interaction module 116 may be configured by the provider, administrator, moderator, and/or any other entities related to the virtual space as desired. For example, the user interaction module 116 may be configured to obtain all of the user interactions in the last 5 days or last 5 play sessions by the given user, first 20 user interaction by the given user on each day of the last 5 days, first 20 user interactions by the given user in each of the last 5 sessions, first 5 minute user interactions by the given user on each day of the last 5 days, first 5 minute user interactions by the given user in each of the last 5 play sessions.

In some exemplary implementations, user interaction module 116 may be configured to determine patterns of user interactions with the virtual space based on the obtained user interaction information. The patterns of user interactions determined by the user interaction module 116 may reflect routines that appeared in the user interactions, playing styles by which the users interact with the virtual space, one or more user actions undertaken by users with certain frequencies, and/or any other patterns of the user interactions. For example, the user interaction information obtained by the user interaction module 116 for a given user may indicate that the given user upgrades the level of a knight controlled by the given user as the first interaction during the given user's participation in the virtual space whenever the knight may be updated in the virtual space (e.g., resources and/or experience points for upgrading the knight to the next level have been acquired by the user). In some examples, the determined user patterns by the user interaction module 116 may include multiple user interactions reflecting routines undertaken by users during play sessions. For example, the user interaction information obtained for a given user may indicate that the given user typically undertake a routine in the following order in the first 5 minute of a play session: builds 5 farms to increase food supply for the cities controlled by the given user, recruits available conscripts in the user's cities to armies controlled by the user, adjusts tax rate to adapt to the increased population in the user's cities, assign idle population (e.g., the dwellers in the cities grown between user's play sessions) to farming, lumbering, and engineering activities engaged by the given user in the virtual space, trains his armies with resources gathered during the period from the last play session, upgrades a knight controlled by the given user whenever such an upgrade is first available to the user and/or any other user interactions that may be engaged by the user in the play session.

In some examples, the determination of the patterns of user interactions by the user interaction module 116 may be based on interaction levels of the users in the virtual space. For example, for a given user, various parameters, such as, types of user interactions (e.g. harvest, farming, gathering, training, building, etc.), frame of examination (e.g. first five minutes of play sessions of interest), a quantity of interactions to be examined (e.g. first 100 actions), interactions with certain frequency to be examined (e.g., actions performed by users at least twice in the frame of examination), interactions with certain duration to be examined (e.g. actions performed in the frame of examination that take at least 20 minute to complete), and/or any other parameters for examining the user interactions for examining the obtained user interaction information may be made based on the interaction level of the given user in the virtual space. For instance, for an interaction level 1 user, the pattern of user interactions may be determined based on first 10 harvest interactions by the level 1 users in the first 45 minute of individual play sessions of interest by the interaction level 1 user; for an interaction level 2 user, the pattern of user interactions may be determined based on first 20 harvest and gathering interactions by the interaction level 2 users in the first 60 minute of individual play sessions of interest by the interaction level 2 user; for an interaction level 3 user, the pattern of user interactions may be determined based on first 30 harvest, gathering, and crafting interactions by the interaction level 3 user in the first 90 minute of individual play sessions of interest by the interaction level 3 user; and so on.

The automatic action determination module 118 may be configured to determine user interactions to be automatically executed in the virtual space on behalf of users while users are not participating in the virtual space. The user interactions to be automatically executed in the virtual space may be determined by the automatic action determination module 118 based on the user interaction information obtained by the user interaction module 116. For determining automatic execution of user interactions by a given user, the automatic action determination module 118 may examine the user interaction information and determine one or more user interactions may be automatically executed in the virtual space while the given user not participating in the virtual space (e.g., not logged in the virtual space) based on the result of such examinations.

In some exemplary implementations, the automatic action determination module 118 may be configured such that the determination of the automatic execution of the user interaction by the automatic action determination module 118 may include a selection of one or snore types of user interactions by the given user to be automatically executed on behalf of the given user while the user not participating in the virtual space. Examples of interaction types that may be selected by the automatic action determination module 118 may include farming, crafting, engineering, mining, resource gathering (e.g., tree chopping, herbal collection), skinning, jewel crafting, leather working, fishing, cooking, healing, and/or any other user interaction types. In those exemplary implementations, according to the interaction types selected by the automatic action determination module 118, the automatic action determination module 118 may determine certain user interactions corresponding to the selected interaction types to be automatically executed in the virtual space on behalf of the given user while the user not participating in the virtual space.

In some examples, the selection of such interaction types may be made based on the interaction level of the given user in the virtual space. For example, rules may be predetermined by a provider of the virtual space and configured into the automatic action determination module 118 such that automatic action determination module 118 may determine automatic execution of harvesting interactions by interaction level 1 users while the interaction level 1 users are not participating in the virtual space; automatic execution of harvesting and gathering interactions by interaction level 2 users, harvesting, gathering, and crafting interactions by interaction level 3 users, harvesting, gathering, crafting and farming by interaction level 4 users and so on.

In some exemplary implementations, the automatic action determination module 118 may be configured such that the determination of the user interactions to be automatically executed in the virtual space on behalf of the given user may include a determination of a quantity of the user interactions to be automatically executed. For example, the automatic action determination module 118 may determine that, for a given user, 20 user interactions may be automatically executed in the virtual space on behalf of the given user while the given user not participating in the virtual space. In some examples, such determinations by the automatic action determination module 118 may be made for the given user based on the interaction level of the given user in the virtual space. By way of a non-limiting example, the automatic action determination module 118 may be configured to determine that 10 user interactions by interaction level 1 users may be automatically executed in the virtual space while the interaction level 1 users not participating in the virtual space; that 20 user interactions by interaction level 2 users may be automatically executed in the virtual space while the interaction level 2 users not participating in the virtual space; that 30 user interactions by interaction level 3 users may be automatically executed in the virtual space while the interaction level 3 users not participating in the virtual space; and so on.

In some exemplary implementations, the automatic action determination module 118 may be configured such that the determination of the user interactions to be automatically executed in the virtual space on behalf of the given user may include a determination of duration during which the determined user interactions are to be so automatically executed. The duration determined by the automatic action determination module 118 may include real-world time period, such as, a specific time period while the given user not participating in the virtual space. For example, the automatic action determination module 118 may determine that the determined user interactions are to be automatically executed on behalf of the given user in the virtual space between 4:00 AM to 5:00 AM in the morning while the given user participating in the virtual space.

In some examples, such determinations may be based on interaction levels of the users. For example, the automatic action determination module 118 may determine that the automatic execution of the determined user interactions by interaction level 1 users may be performed between 6:00 PM and 7:00 PM on behalf of the interaction level 1 users while the interaction level 1 users not participating in the virtual space; that the automatic execution of the determined user interactions by interaction level 2 users may be performed between 5:00 PM and the 7:00 PM on behalf of the interaction level 2 users while the interaction level 2 users not participating in the virtual space; that the automatic execution of the determined user interactions by interaction level 3 users may be performed between 4:00 PM and 7:00 PM on behalf of the interaction level 3 users where the interaction level 3 users participating in the virtual space; and so on.

In some exemplary implementations, the automatic action determination module 118 may be configured such that the determination of the user interactions to be automatically executed in the virtual space on behalf of the given user may include a determination of frequencies at which the determined user interactions are to be automatically executed. Such a frequency determined by the automatic action determination module 118 may specify a number of times of the automatic execution of the determined user interaction may be performed, e.g., by the automatic action execution module 120, within the virtual space while the given user not participating in the virtual space. For example, the automatic action determination module 118 may determine, for a given user, that the determined user interactions may be automatically executed in the virtual space on behalf of the given user 3 times a day by the user the participating in the virtual space.

In some examples, such determinations by the automatic action determination module 118 may be made based on the interaction level of the given user in the virtual space. For example, the automatic action determination module 118 may determine that the automatic execution of the determined user interactions by interaction level 1 users may be performed once a day while the interaction level 1 users not participating in the virtual space; that the automatic execution of the determined user interactions by interaction level 2 users may be performed twice a day while the interaction level 2 users not participating in the virtual space; that the automatic execution of the determined user interactions interaction level 3 users may be performed 3 times a day while the interaction level 3 users not participating in the virtual space; and so on.

In some exemplary examples, the automatic user action determination module 118 may be configured to determine amounts of virtual resources to be exhausted during the automatic execution of the determined user interactions. One or more types of virtual resources, such as, but not limited to, gems, stones, lumber, oil, and any other virtual resources, may be exhausted during the automatic execution of the user interactions by a given user as determined by the automatic action determination module 118. The virtual resources exhausted by the automatic action determination module 118 may be in addition to those exhausted by the automatically executed user interactions during their normal courses. For example, the automatic action determination module 118 may determine that 500 stones may be exhausted during the automatic execution of the user interactions determined by automatic action determination module 118, which may exhaust certain amount of virtual resources including stones as required by the virtual space activities involved in those user interactions, while the given user not participating in the virtual space.

In some examples, such determinations by the automatic action determination module 118 may be made based on the interaction level of the given user in the virtual space. For example, the automatic action determination module 118 may determine that the automatic execution of the determined user interactions by level 1 users may exhaust 1000 stones; that the automatic execution of the determined user interactions by level 2 users may exhaust 500 stones; that the automatic execution of the determined user interactions an interaction level 3 users may exhaust 250 stones; and so on.

In some exemplary implementations, the automatic user action determination module 118 may be configured such that the determinations of types of, quantities of, durations of, frequencies of, and/or virtual space resources exhausted by the user interactions to be automatically executed in the virtual space on behalf of the users while the users not participating in the virtual space are based on quantities of virtual and/or real-world items spent by the users for automatically executing the determined user interactions. For example, the provider of the virtual space may determine that a given user may schedule automatic execution of the user interactions determined by the automatic action determination module 118 for certain amount of virtual items and/or real-world currencies. For instance, it may be determined that a user may spend 10 gems, or $4.99 to the schedule the automatic execution of the user interactions determined by the automatic action determination module 118.

In some exemplary implementations, the automatic action determination module 118 may be configured such that the determinations of the user interactions to be automatically executed in the virtual space on behalf of the users may be based on the user interaction patterns determined by the user interaction module 116. For example, the user interaction pattern determined by the user interaction module 116 for a given user may indicate a routine undertaken by the given user with high frequency (for example, during 70% of the given user's play sessions, the given user undertakes this routine). In that example, the determination of the automatic execution of the user interactions by the automatic action determination module 118 may be based on such a routine. For example, user interactions of certain interaction types in this routine, e.g., gathering and harvesting, may be determined by the automatic action determination module 118 to be automatically executed in the virtual space while the given user not participating in the virtual space.

The automatic action execution module 120 may be configured to automatically execute, in the virtual space, the user interactions determined by the automatic action determination module 118. In some exemplary implementations, such automatic executions of user interactions for a given user may be performed by the automatic action execution module 120 during a period and/or at a frequency as determined by the automatic action determination module 118 for the given user. In some exemplary implementations, the user interactions automatically executed by the automatic action execution module 120 may be performed as though there were initiated by the users such that other users in the virtual space do not easily recognize the users are not participating in the virtual space. In some exemplary implementations, the automatic execution of the user interactions by the automatic action execution module 120 may merely modify the virtual space state as the result of the user interactions without really executing the user interactions. For example, in case where the automatic execution the user interactions involve building 5 farms for the given user, the automatic action execution module 120 may request the 5 farms to be recorded in an object database as being owned by the given user without executing the building of the 5 farms in normal courses, which may take e.g., 30 minutes to complete.

The server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute modules 112, 114, 116, 118, 120. Processor 108 may be configured to execute modules 112, 114, 116, 118, 120 by software; hardware; firmware; some combination of software, hardware, and/or firmware; and/or other mechanisms for configuring processing capabilities on processor 108.

It should be appreciated that although modules 112, 114, 116, 118, 120 are illustrated in FIG. 1 as being co-located within a single processing unit, in implementations in which processor 108 includes multiple processing units, one or more of modules 112, 114, 116, 118, 120 may be located remotely from the other modules. The description of the functionality provided by the different modules 112, 114, 116, 118, 120 described below is for illustrative purposes, and is not intended to be limiting, as any of modules 112, 114, 116, 118, 120 may provide more or less functionality than is described. For example, one or more of modules 112, 114, 116, 118, 120 may be eliminated, and some or all of its functionality may be provided by other ones of modules 112, 114, 116, 118, 120. As another example, processor 108 may be configured to execute one or more additional modules that may perform some or all of the functionality attributed below to one of modules 112, 114, 116, 118, 120.

Figure 2:
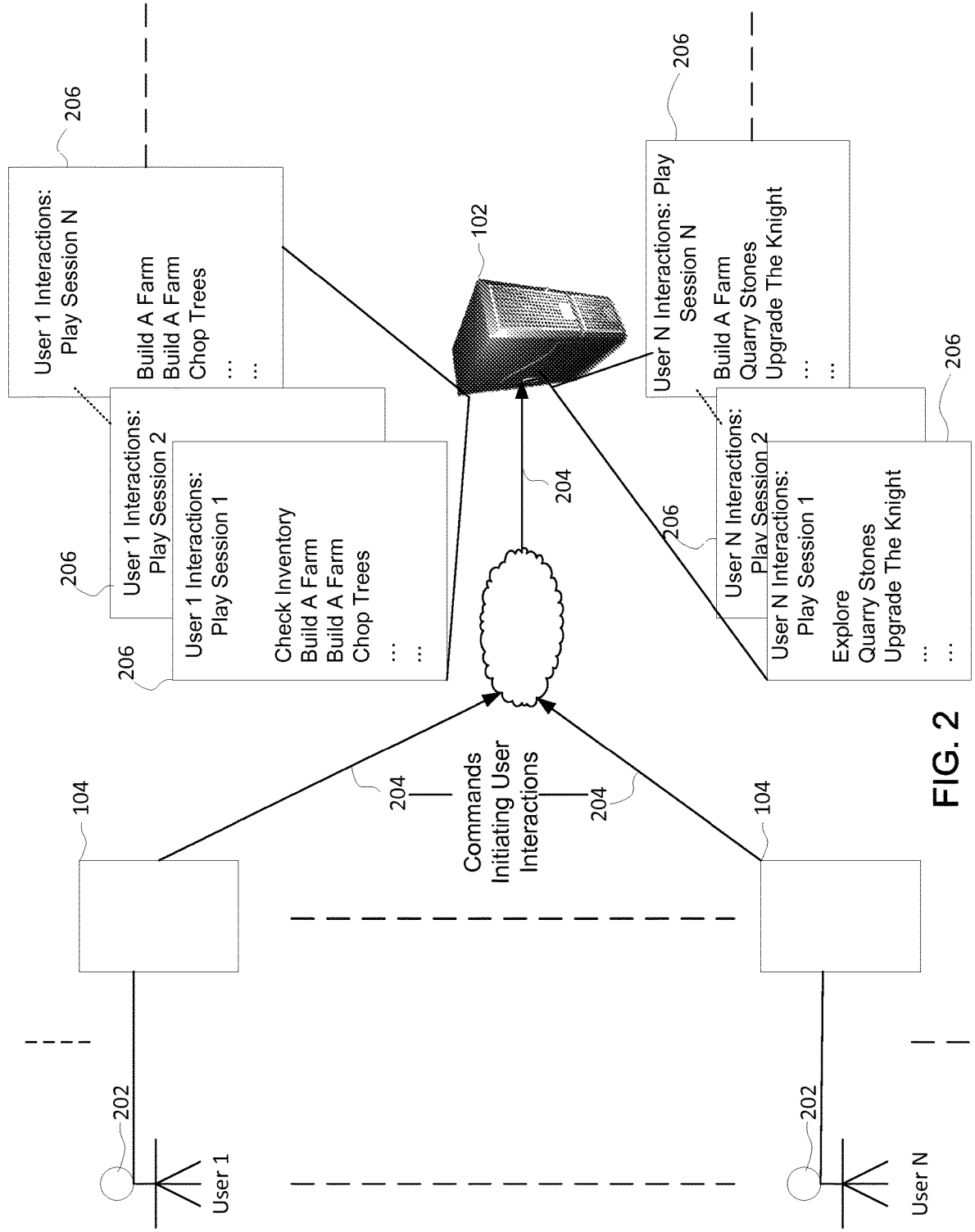
FIG. 2 illustrates one example of monitoring user interactions for determinations of automatic execution of the user interactions in the virtual space by using the system shown in FIG. 1.

FIG. 2 illustrates one example of monitoring user interactions for determinations of automatic execution of the user interactions in the virtual space by using the system 100 shown in FIG. 1. It will be described with references to FIG. 1. In this example, as illustrated, users 202 associated with client computer platforms 104 may initiate virtual space commands 204 to interact with the virtual space. As shown, the virtual space commands initiated by the users 202 may be received by the server 102. User interactions 206 initiated by the commands 204 may be monitored and recorded by the server 102 for individual users in the virtual space as shown.

Figure 3:
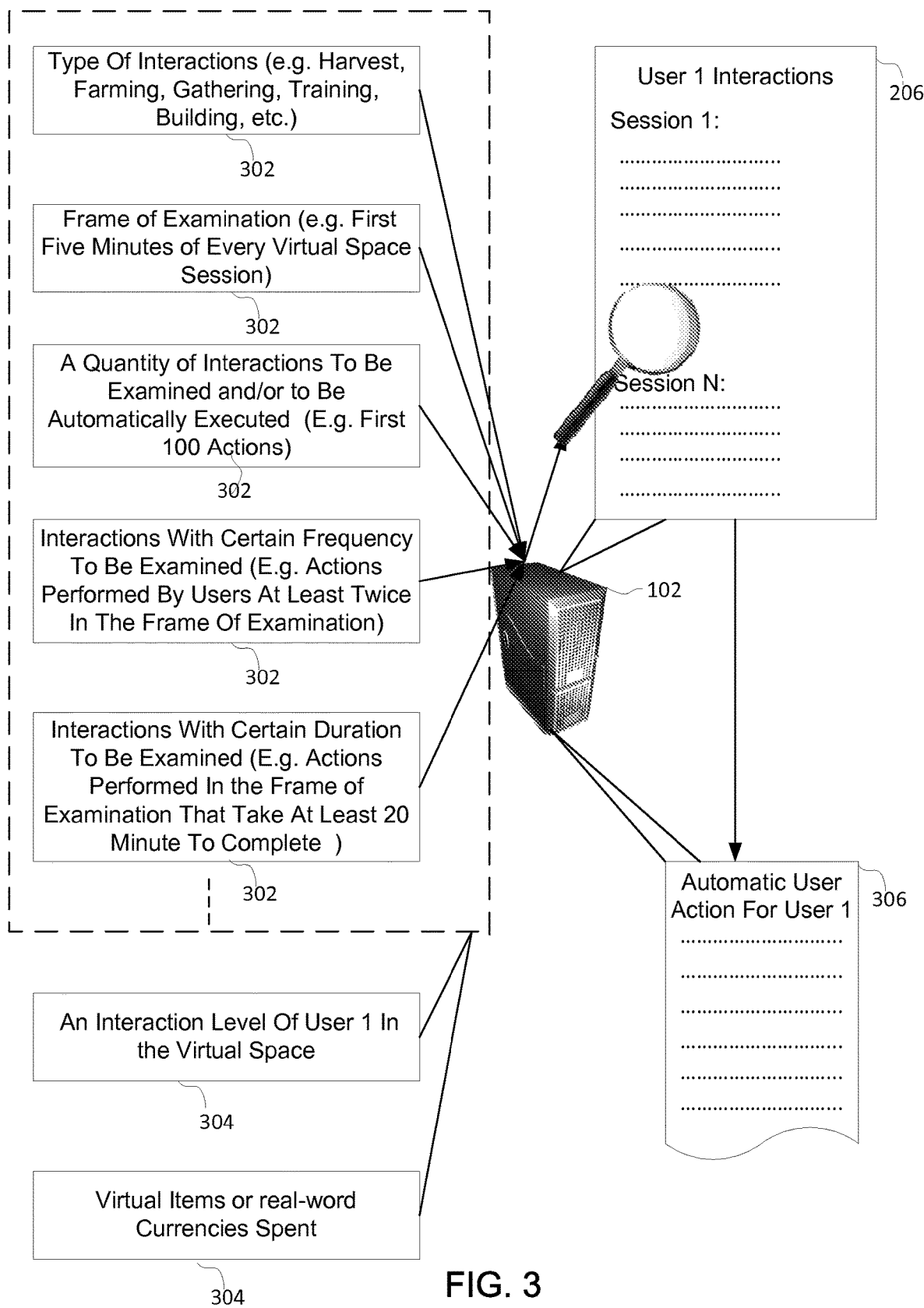
FIG. 3 illustrates one example of determining user interactions to be automatically executed on behalf of a user of the system shown in FIG. 1 while the user not in the virtual space.

FIG. 3 illustrates one example of determining user interactions to be automatically executed on behalf of a user of the system 100 shown in FIG. 1 while the user not in the virtual space. It will be described with references to FIGS. 1-2. As shown in this examples, various parameters 302 of the determination of the automatic execution of the user interaction for a user, e.g., user 1 in this example, may be configured into server 102, e.g., via the automatic action determination module. As shown, the parameters 302 may be adjusted by parameters 304, i.e. the interaction level of the user 1, the virtual items and/or real-world currencies spent by user 1 for the determination of the automatic execution of the user interactions. As shown, the parameters 302 may be used by the server 102, e.g., via an automatic action execution module 120, to determine one or more user interactions 204 to be automatically executed in the virtual space as automatic user interactions 306.

Figure 4:
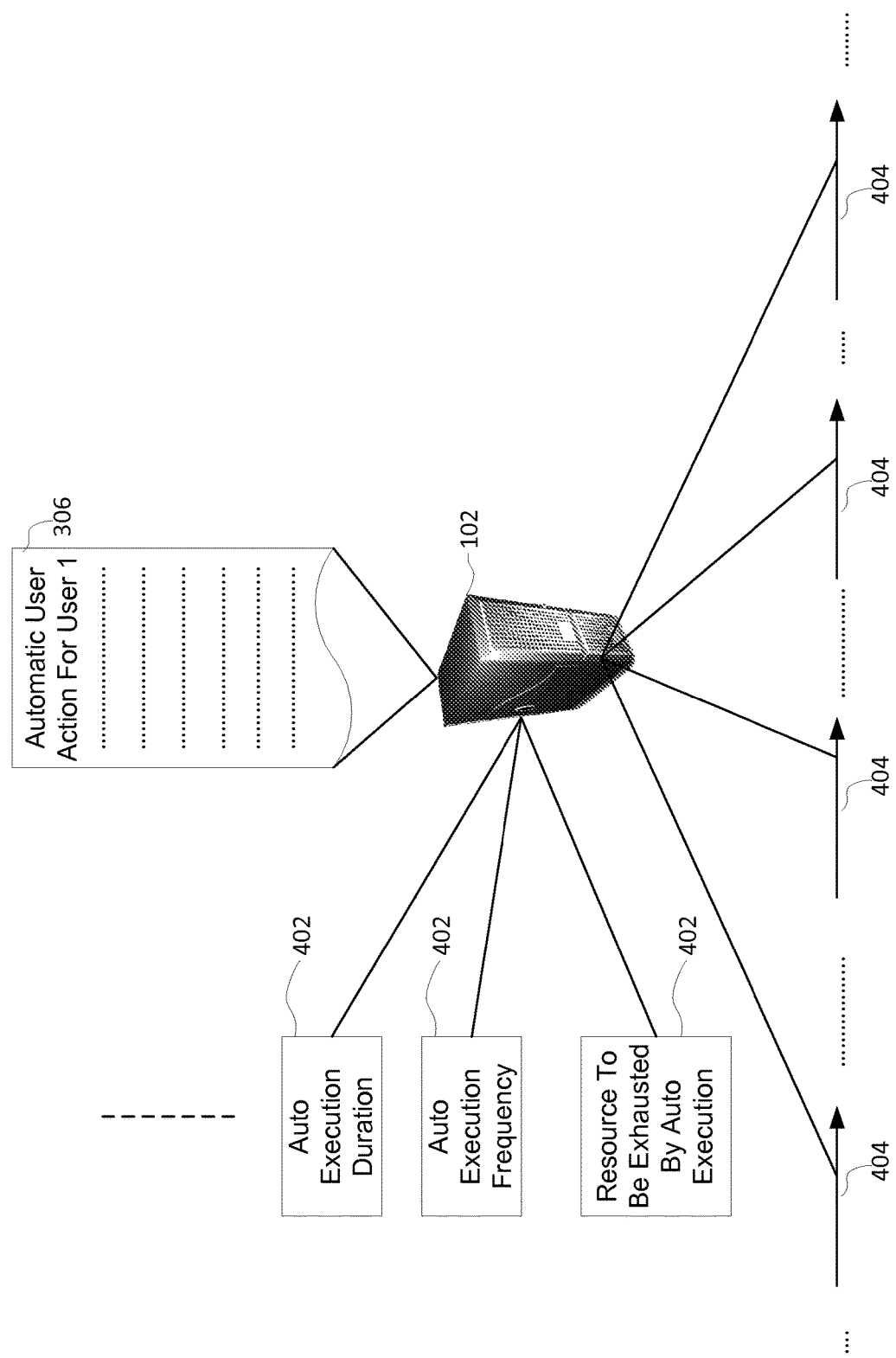
FIG. 4 illustrates one example of automatically executing the user interactions determined in FIG. 3 for the user.

FIG. 4 illustrates one example of automatically executing the user interactions determined in FIG. 3 for the user. It will be described with references to FIGS. 1-3. As shown, the to-be automatic executed user 1's interactions 306 may be executed on behalf the user 1 during periods of 404 when user 1 is not participating in the virtual space. As also shown, the automatic execution of the user 1's interactions 306 may be performed during those periods in accordance with various automatic execution parameters 302 determined by the server 102.

Figure 5:
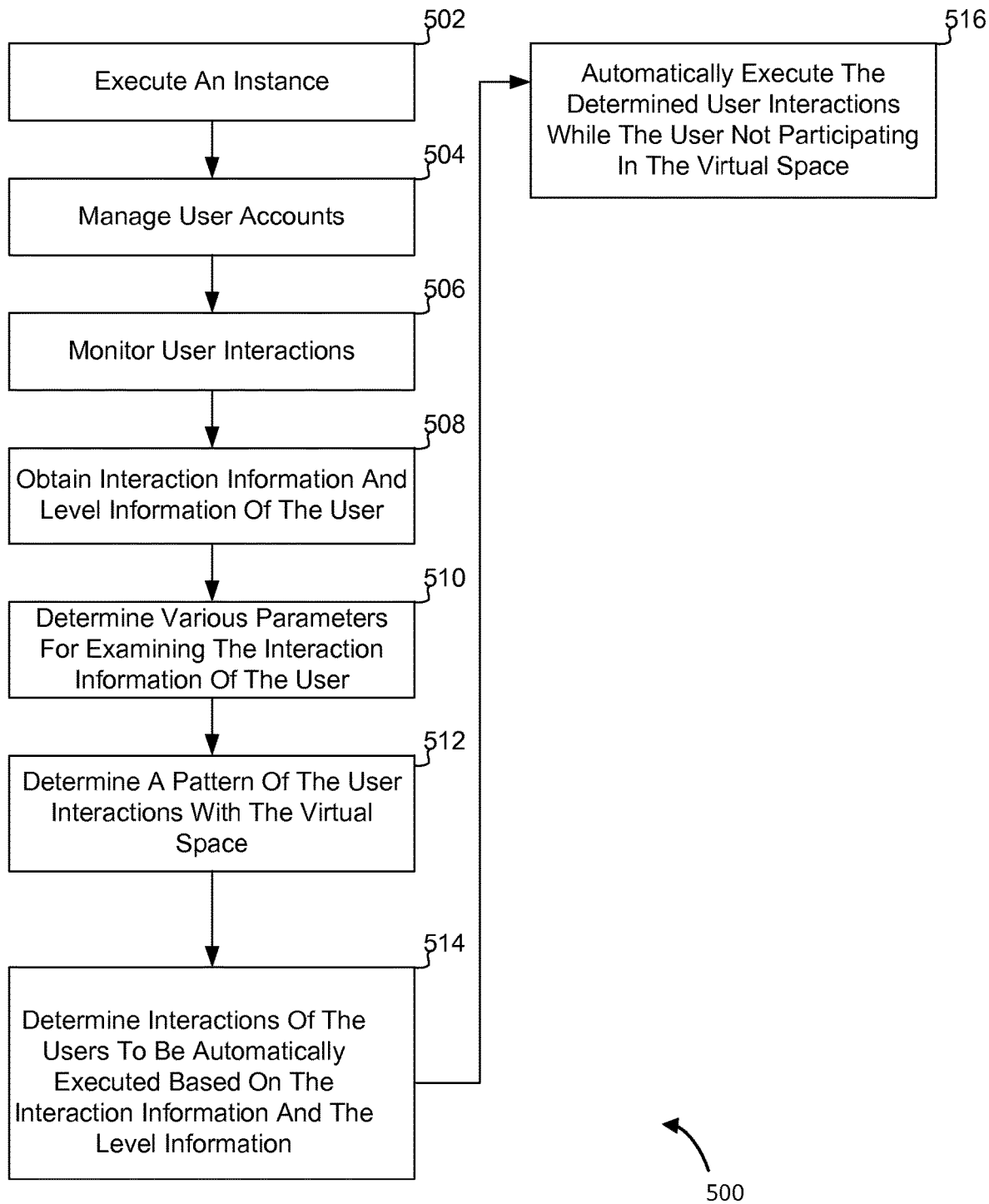
FIG. 5 illustrates a method 500 of facilitating automatic execution of user interaction with an instance of virtual space in accordance with the virtual space.

FIG. 5 illustrates a method 500 of facilitating automatic execution of user interaction with an instance of virtual space in accordance with the virtual space. The operations of method 500 presented below are intended to be illustrative. In some embodiments, method 500 may be accomplished with one or more additional operations not described, and/or without one or more of the operations discussed. Additionally, the order in which the operations of method xx are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, an instance of a virtual space may be executed and implemented to determine view information for transmission to one or more client computing platforms associated with users. The users may interact with the virtual space by initiating virtual space commands. The users may include a first user. The first user may control a first entity. In some implementations, operation 502 may be performed by a space module the same as or similar to space module 112 (shown in FIG. 1 and described herein).

At an operation 504, user accounts associated with the users may be managed. The user accounts may include a first account associated with the first user. The first account may include a first set of user parameters that correspond to the first user. In some implementations, operation 504 may be performed by a user module the same as or similar to user module 114 (shown in FIG. 1 and described herein).

At an operation 506, user interactions with the instance of the virtual space may be monitored. This may include monitoring, for a given user, one or more times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. In some implementations, operation 506 may be performed by a user interaction module 116 the same as or similar to user interaction module 116 (shown in FIG. 1 and described herein).

At an operation of 508, interaction information reflecting previous user interactions by a user in the virtual space and level information indicating an interaction level of the user may be obtained. The user interaction information of the user obtained in operation 508 may indicate interactions by the user as monitored in operation 506 previously, e.g., during a past real-world time period or virtual space period. The level information obtained in operation 508 may reflect an amount of interactions with the virtual space that has been engaged in by the user. In some implementations, operation 508 may be performed by a user interaction module 116 the same as or similar to user interaction module 116 (shown in FIG. 1 and described herein).

At an operation 510, parameters for examining the interaction information of the user obtained in operation 508 may be determined. The parameters determined in operation 610 may include one or more types of user interactions by the user, a frame of examination (e.g., first 5 minutes of user interactions in each play session by the user), a quantity of user interactions to be examined, interactions with certain frequencies, interactions for certain duration, and/or any other parameters for examining the user interactions indicated in the obtained user interaction information. In some implementations, operation 510 may be performed by a user interaction 116 the same as or similar to user interaction module 116 (shown in FIG. 1 and described herein).

At an operation 512, a pattern of user interactions by the user may be determined based on the user interaction information obtained in operation 508 in accordance with the parameters determined in operation 510. In some examples, the pattern of user interaction by the user may be determined further based on level information obtained in operation 508. In some implementations, operation 512 may be performed by a user interaction 116 the same as or similar to user interaction module 116 (shown in FIG. 1 and described herein).

At an operation 514, user interactions to be automatically executed on behalf the user while the user not participating in the virtual space may be determined. The determination of the automatic execution of the user interaction by the user in operation 514 may include a selection of one or more types of user interactions to be automatically executed, a determination of a quantity of the user interactions to be automatically executed, a determination of duration during which the determined user interactions are to be automatically executed, a determination of one or more frequencies at which the determined user interactions are to be automatically executed, and/or any other sub-operations. In some examples, the determination in operation 514 may be based on the level information obtained in operation 508. In some implementations, operation 514 may be performed by an automatic action determination module the same as or similar to automatic action determination module 118 (shown in FIG. 1 and described herein).

At an operation 516, the user interactions determined in operation 514 may be automatically executed in the virtual space on behalf of the user. In some implementations, operation 516 may be performed by an automatic action execution module 120 the same as or similar to automatic action execution module 120 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for automatically executing one or more user interactions in a game, the system comprising:
   one or more physical processors configured by machine-readable instructions to:
   execute an instance of the game, to implement the instance of the game by receiving and executing commands to facilitate user interactions of individual users within the game, wherein the user interactions are monitored;
   determine, based on the monitoring, amounts of interaction of the individual users within the game while participating in the game, the amounts of interaction including a first amount of interaction for a first user that reflects an amount of interaction within the game by the first user;
   determine types of interactions performed by the individual users within the game, the types of interactions including a first type of interactions performed by the first user within the game;
   manage user accounts associated with the individual users in the game, wherein the user accounts include user information and user inventories, wherein the user accounts include a first user account associated with the first user, wherein the first user account includes a first user inventory;
   determine patterns of interactions of the individual users, wherein determinations of the determined patterns of interactions are based on:
   (i) the determined amounts of interaction of the individual users, and
   (ii) the determined types of interactions performed by the individual users,
   wherein the determined patterns of interactions include a first pattern of interactions of the first user;
   determine automated user interactions based on the determined patterns of interactions of the individual users, wherein the automated user interactions are to be automatically executed in the game on behalf of the individual users while the individual users are not individually participating in the game, wherein the determined automated user interactions include first automated user interactions of the first user; and
   automatically execute, in the game, the determined automated user interactions as determined, such that the first automated user interactions are automatically executed in the game on behalf of the first user.

2. The system of claim 1, wherein the user information indicates the determined amounts of interaction of the individual users and the determined types of interaction of the individual users.

3. The system of claim 1, wherein the game includes interactions within a virtual space.

4. The system of claim 1, wherein the one or more physical processors are further configured by machine-readable instructions to determine view information for presentations of the game on client computing platforms, wherein individual ones of the client computing platforms are associated with individual ones of the users.

5. The system of claim 1, wherein the one or more physical processors are further configured by machine-readable instructions such that the determination of the first automated user interactions includes a selection of a type of game interactions to be automatically executed on behalf of the first user while the first user is not participating in the game.

6. The system of claim 1, wherein the one or more physical processors are further configured by machine-readable instructions such that the determination of the first automated user interactions includes a determination of a frequency at which the first automated user interactions are to be executed in the game on behalf the first user while the first user is not participating in the game.

7. The system of claim 1, wherein the determination of the first automated user interactions to be automatically executed in the game on behalf of the first user while the first user is not participating in the game includes determinations of:
   (i) types of the first automated user interactions,
   (ii) quantities of the first automated user interactions,
   (iii) durations of the first automated user interactions,
   (iv) frequencies of the first automated user interactions, and/or
   (v) game resources exhausted by the first automated user interactions.

8. The system of claim 1, wherein the one or more physical processors are further configured by machine-readable instructions such that the determinations of the first automated user interactions are further based on quantities of virtual and/or real-world items spent by the first user for automatically executing the first automated user interactions.

9. The system of claim 1, wherein the one or more physical processors are further configured by machine-readable instructions to automatically update the first user account including the first user inventory based on results from automatically executing the first automated user interactions.

10. The system of claim 1, wherein the first pattern of interactions of the first user further based on a number of inter-use communications over a length of time, wherein the number of inter-user communications are communications involving the first user.

11. A computer-implemented method of facilitating automatic execution of one or more user interactions in a game, the method being implemented in one or more physical processors configured by machine-readable instructions, the method comprising:
   executing an instance of a game and facilitating user interactions of individual users within the game;
   monitoring, by the one or more physical processors, the user interactions;
   determining, based on the monitoring, amounts of interaction of the individual users within the game, the amounts of interaction including a first amount of interaction for a first user that reflects an amount of interaction within the game by the first user;
   determining, by the one or more physical processors, types of interactions performed by the individual users within the game, the types of interactions including a first type of interactions performed by the first user within the game;

managing user accounts associated with the individual users in the game, wherein the user accounts include user information and user inventories, wherein the user accounts include a first user account associated with the first user, wherein the first user account includes a first user inventory;

determining, by the one or more physical processors, patterns of interactions of the individual users, wherein determinations of the determined patterns of interactions are based on:
  (i) the determined amounts of interaction of the individual users and
  (ii) the determined types of interactions performed by the individual users,
wherein the determined patterns include a first pattern of interactions of the first user;

determining, by the one or more physical processors, automated user interactions to be automatically executed in the game on behalf of the individual users while the individual users are not individually participating in the game, wherein the determined automated user interactions include first automated user interactions of the first user; and automatically executing, in the game, the determined automated user interactions such that the first automated user interactions are automatically executed in the game on behalf of the first user while the first user is not participating in the game.

12. The method of claim 11, wherein the user information indicates the determined amounts of interaction of the individual users and the determined types of interaction of the individual users.

13. The method of claim 11, wherein the game includes interactions within a virtual space.

14. The method of claim 11, further comprising:
determining view information for presentations of the game on client computing platforms, wherein individual ones of the client computing platforms are associated with individual ones of the users.

15. The method of claim 11, wherein the determination of the first automated user interactions includes a selection of a type of game interactions to be automatically executed on behalf of the first user while the first user is not participating in the game.

16. The method of claim 11, wherein the determination of the first automated user interactions includes a determination of a frequency at which the first automated user interactions are to be executed in the game on behalf the first user while the first user is not participating in the game.

17. The method of claim 11, wherein the determination of the first automated user interactions to be automatically executed in the game on behalf of the first user while the first user is not participating in the game includes determinations of:
  (i) types of the first automated user interactions,
  (ii) quantities of the first automated user interactions,
  (iii) durations of the first automated user interactions,
  (iv) frequencies of the first automated user interactions, and/or
  (v) game resources exhausted by the first automated user interactions.

18. The method of claim 11, wherein the determinations of the first automated user interactions are further based on quantities of virtual and/or real-world items spent by the first user for automatically executing the first automated user interactions.

19. The method of claim 11, further comprising:
automatically updating the first user account including the first user inventory based on results from automatically executing the first automated user interactions.

20. The method of claim 11, wherein the first pattern of interactions of the first user is further based on a number of inter-use communications over a length of time, wherein the number of inter-user communications are communications involving the first user.

* * * * *